Dec. 12, 1972  TOKIO WADA  3,705,833
LABELLER

Filed Oct. 2, 1970  7 Sheets-Sheet 2

INVENTOR

TOKIO WADA

BY Barthel & Bugbee

ATTORNEY 6a  8a 8b  6b 8c  6c

United States Patent Office 3,705,833
Patented Dec. 12, 1972

3,705,833
LABELLER
Tokio Wada, 12–15 4-chome Horifune, Kita-ku,
Tokyo, Japan
Filed Oct. 2, 1970, Ser. No. 77,420
Int. Cl. B32b *31/00;* B41f *1/08*
U.S. Cl. 156—384                        9 Claims

ABSTRACT OF THE DISCLOSURE

A labeller comprising a swing lever and a push-out lever mounted to a frame, a stamp pad and tape turning member, a push-out window adjacent to said member, a stamping means provided on the swing lever, a push-out member at the window provided on the push-out lever, a movable rotor for feeding a tape and an engaging means for performing stamping motion and controlling movement of the push-out lever, whereby separation of the label from the tape and pushing out from the label are consecutively performed by one operation of the swing lever.

---

This invention relates to labellers.

Heretofore, the labellers in general use have had many inconveniences. It has previously occured that the letters stamped on a label could not be correctly positioned in the middle of the label. Application of a stamped label on an article often required use of two hands so that it was very difficult to apply the label on the article efficiently and rapidly. When letters stamped on a label were changed, a special difficulty was encountered for applying a correctly stamped label in the same applied position on an article.

The invention is intended to eliminate above disadvantages.

The principal object of the invention is to provide a labeller which can apply a label on a small box, a bag and like article by single operation of a hand and which is small in size and free from troubles. Here, the lael is coated with a bonding agent on the back surface and carried by a tape releasably supporting the label.

Other object of the invention is to provide a labeller which permits correct stamping of letters in a desired position on a label and rapid application of the stamped label to a desired position on an article.

Other objects and features of the invention will appear from the following description, reference being had to the accompanying drawings, in which.

Figure 1:
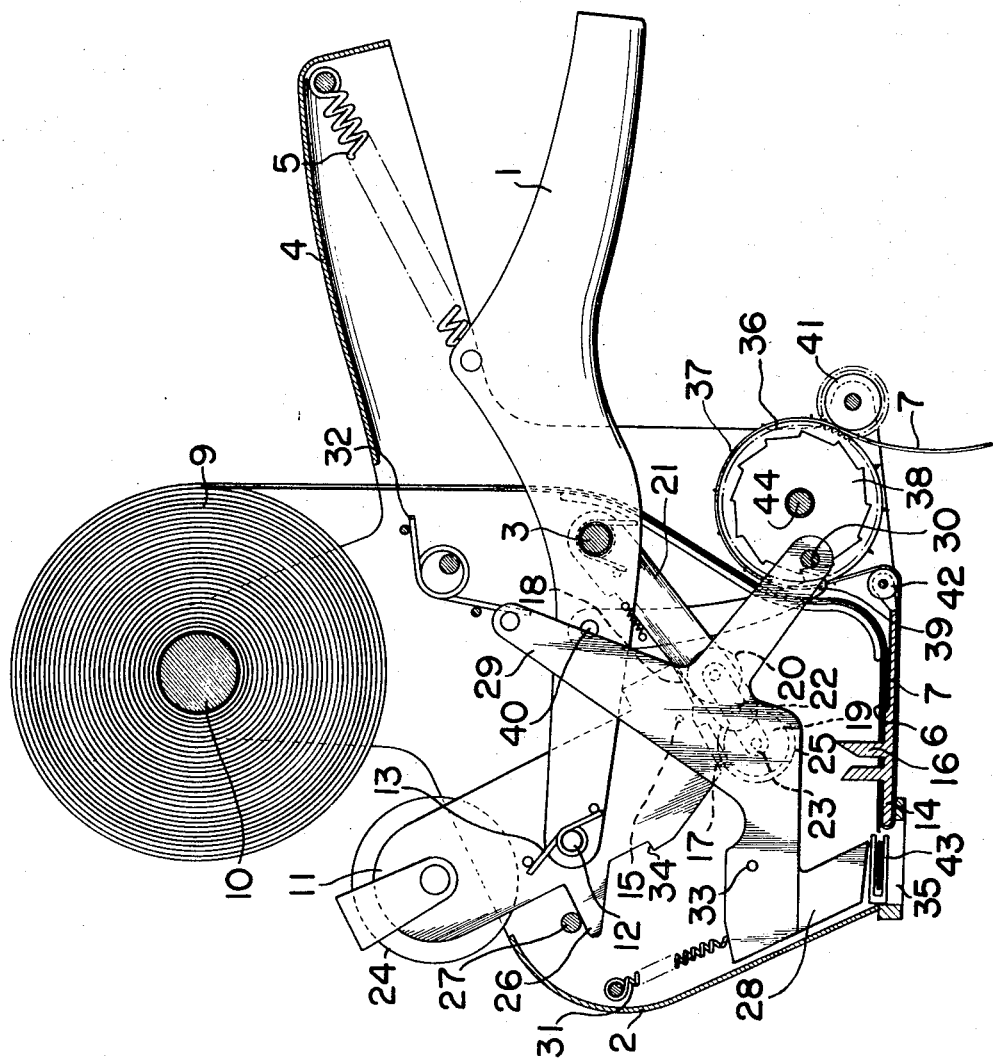
FIGS. 1 and 2 show a side elevation, partly in section, of a first embodiment according to this invention, FIG. 2 particularly showing it in the gripped state of a lever.
Figure 2:
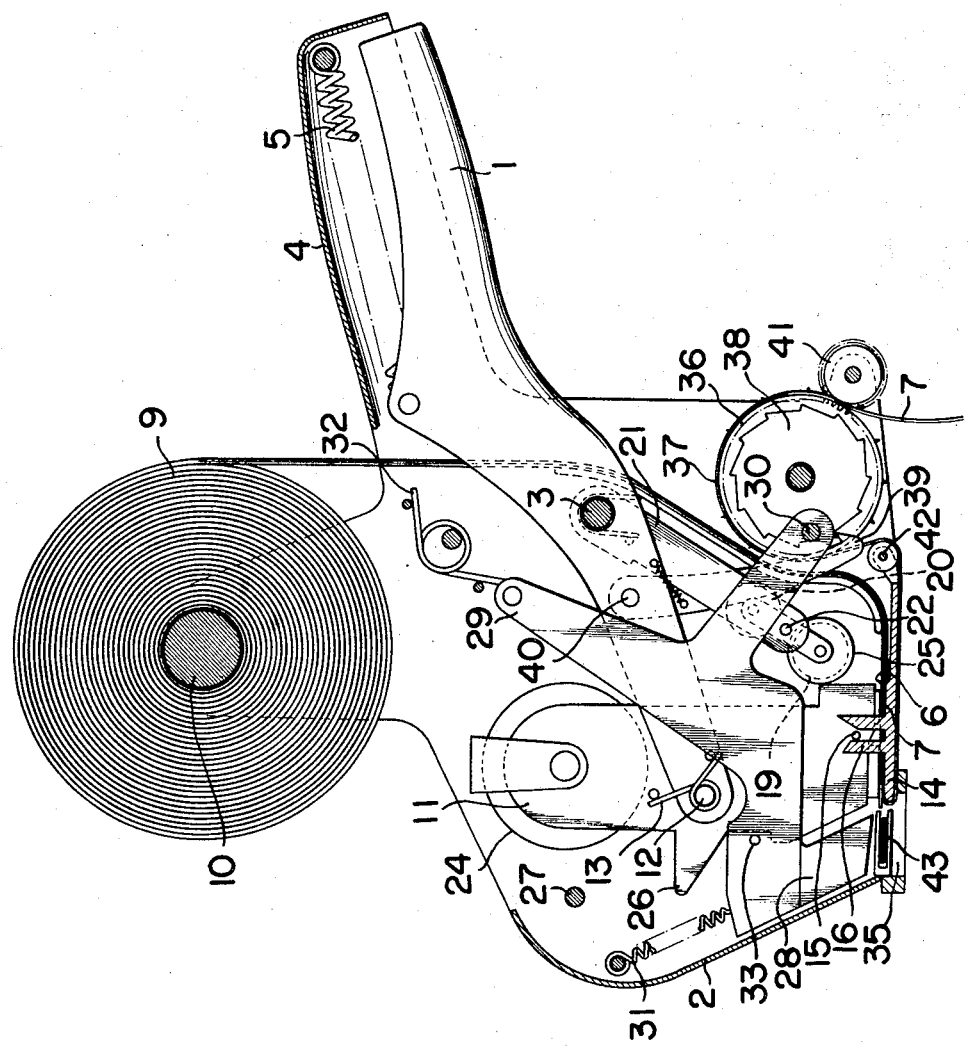

Referring now to the drawings, FIGS. 1 to 10, a swing lever 1 is pivotally attached to a frame 2 by means of a shaft 3. The lever is capable of swinging toward and away from a hand grip 4 projecting from the frame 2. The lever is usually pulled away from the hand grip by a spring 5. A label 6 with bonding agent on the back thereof is carried on a tape 7 by which it is prevented from striking to other parts. In the upper part of the frame 2 is supported a coiled label band 9 upon a shaft 10. The label band 9 is provided with engaging portions on perforations 8a, 8b or 8c between labels 6 at equal intervals. A stamping means 11 is secured to the lever 1 through shaft 12 at the upper front side of the frame 2. The lever 1 has a spring 13 by force of which the stamping means is rotated. A tape turning part 14 is provided at the lower part of the frame 2 to reversely turn the direction of the tape 7. The turning part 14 serves as a stamping pad for stamping. Upon the lever 1 being pulled, the stamping means 11 is pushed down to stamp the label 6 on the turning part 14. The stamping means 11 is provided on its side plate with an engaging part 15, which engages with a slot member 16 on the turning part 14. The stamping means 11 includes a stamping part 17 of which the indicia are changeable and a stamping part 18 of which the indicia are fixed. These parts respectively correspond to ink holding rollers 19 and 20 which serve to apply ink to the described parts. The ink holding rollers 19 and 20 are provided on a short rod 23 which is revolvably attached through shaft 22 to a swing restraining rod 21 which is pivoted to the frame 2 through the shaft 3. Upon downward movement of the stamping means 11, the rollers as described are swung and leave from the stamping parts 17 and 18. The stamping part 17 can change the letters by rotating an operating disk 24 and the stamping part 18 is provided with other letters or marks such as names of a shop and the like. If desired, ink of a different color such as red may be applied to the stamping part by the ink holding roller 20 so as to stamp the label 6. For preventing the ink on the ink holding roller 19 from staining the stamping part 18, there is provided a guide disk 25 to separate the surface of the roller 19 from the surface of the stamping part 18. A guide portion 27 is provided on the frame 2 to engage with an engaging projection 26 formed on a side edge of the stamping means 11. A push-out lever 29 has a label push-out member 28 made of rubber or the like at the forward end. The lever 29 is mounted on a shaft 30 on the frame 2 and a spring 31 is provided to retract it. For pushing out the label push-out member 28, there is provided a push-out spring 32 on the lever 29. An engaging shaft 33 on the lever 29 is adapted to engage with a slot 34 formed on a side edge of the stamping means 11. Below the frame 2 is provided a label push-out window 35 aligned with the label push-out member 28. The frame 2 has a shaft 44 upon which is mounted a movable rotor 36 which has projections 37 engageable with the portions or perforations 8a, 8b or 8c of the tape 7 on its periphery. Also mounted on the shaft 44 is a ratchet wheel 38, and a hook or pawl 39 engageable with the ratchet wheel 38 is attached to the lever 1 by a shaft 40. There are provided a roller 41 for preventing the detachment of the projections 37 from the engaging portions or perforations 8a, 8b or 8c and a guide roller 42. The roller 41 may preferably be made of rubber and higher in peripheral speed so as to synchronize the speed of the tape 7 with the rotor 36. This may be carried out by meshing a gear wheel on the rotor 36 with a gear wheel on the roller 41.

Figure 8:
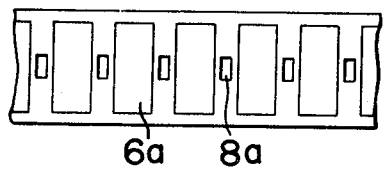
FIGS. 8 to 10 illustrate tapes used in the labeller.
Figure 9:
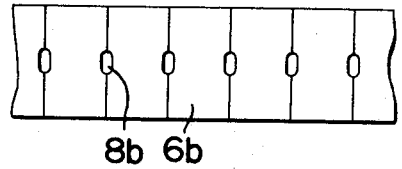
Figure 10:
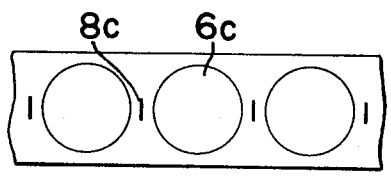

The label 6 may be of any preferred shape such as a rectangular shape 6a, 6b, or a circular shape as shown in FIGS. 8, 9 and 10. The engaging portion or perforation of the tape may be of a rectangular hole 8a as shown in FIG. 8 or an oval hole 8b as shown in FIG. 9, or simply a slit 8c as shown in FIG. 10.

Figure 11:
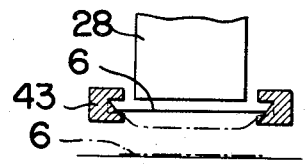
FIG. 11 shows partly in front elevation and partly in cross section, a push-out window for a label.

The label push-out window 35 may have a horizontal approximately U-shaped label receiving member 43 which can receive correctly the label 6 when substantially separated from the tape 7. With the label receiving member formed to temporarily support the opposite edge of the label on its inclined opposite inner surfaces as shown in FIG. 11, instead of being horizontal U-shaped it is possible to secure the positioning of the label 6 by itself.

Operation of the above described labeller will be illustrated with reference to FIGS. 3 to 7.

Figure 3:
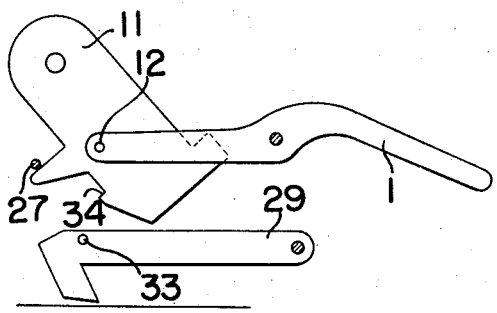
FIGS. 3 to 7 illustrate the operations of the first embodiment.
Figure 4:
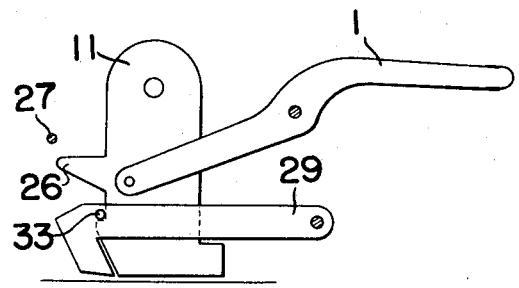
Figure 5:
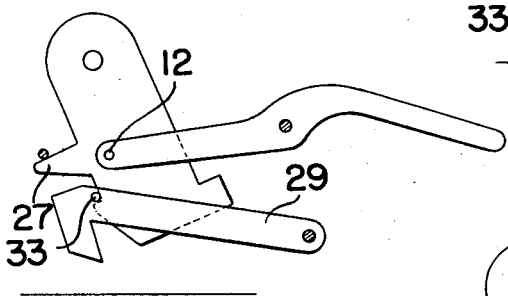
Figure 6:
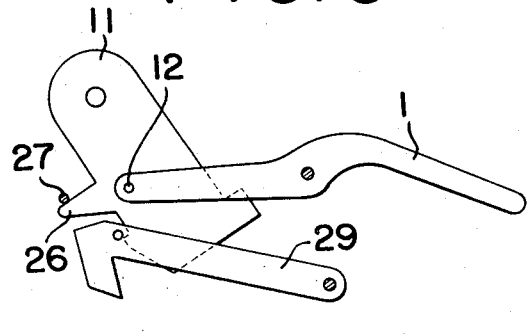
Figure 7:
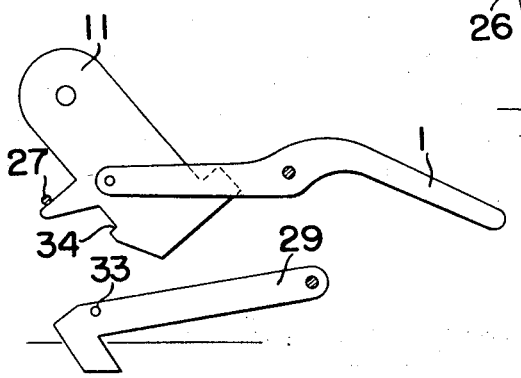

If the lever 1 is grasped and pulled upward from the position of FIG. 3, it is seen that the stamping means 11 will, as shown in FIG. 4, swing about the shaft 12 and be pushed downwards. At the same time, the stamping means 11 stamps the label 6 and the slot 34 is engaged with the shaft 33 of the push-out lever 29. Upon release of the lever 1, the stamping means 11 rises as shown in FIG. 5 and the slot 34 raises the push-out lever 29 and the ratchet bar or pawl 39 revolves the ratchet wheel 38 so that the stamped label 6 is advanced to the label push-out window 35. The engaging projection 26 is guided by the guide projection 27 of the frame 2 as shown in FIG. 6. Thus, the slot 34 and the shaft 33 are parted from each other as shown in FIG. 7. As the slot and the shaft 33 are separated, the push-out lever 28 which has revolved against the force of the push-out spring 32 is operated in a strong manner. Thus, the label 6 stamped with the label push-out member 28 is pushed out of the label push-out window 35 to forcefully apply the label 6 on an article and the label push-out member 28 is pulled through back the push-out window 35 by the push-out lever 29 and the spring 31 so as to be returned to its original position in the frame 2.

In this manner, the single operation of the lever 1 makes the labeller effectively stamp the label 6 and push-out the stamped label 6 from the push-out window 35 to be applied on the article securely. Therefore, the stamped label 6 can be pushed out of the push-out window 35 most efficiently and no labels 6 will be wasted in operation. Furthermore, it is possible to apply the label 6 in a fixed position with the push-out window 35 in contact with the article. The movable rotor 36 for the tape 7 permits the stamping of the label 6 to be effectively accomplished and in a correct position. Since the label receiving member 43 is provided at the window 35, the label which has been detached from the tape 7 is guided to a fixed position at the window 35 so as to be surely applied in the fixed position of the article. It will be noted that the stamping means 11 is pivotally mounted at the forward end of the swing lever 1 so as to rise and fall with the swing movement thereof on the pivot 3. Therefore, the swing lever 1 on the pivot 3 can operate with much ease during the operation of the stamping means without causing troubles during long time use. In accordance with the invention, the overall construction of the labeller is specifically featured by small size, easy manufacture and great facility in handling.

Figure 12:
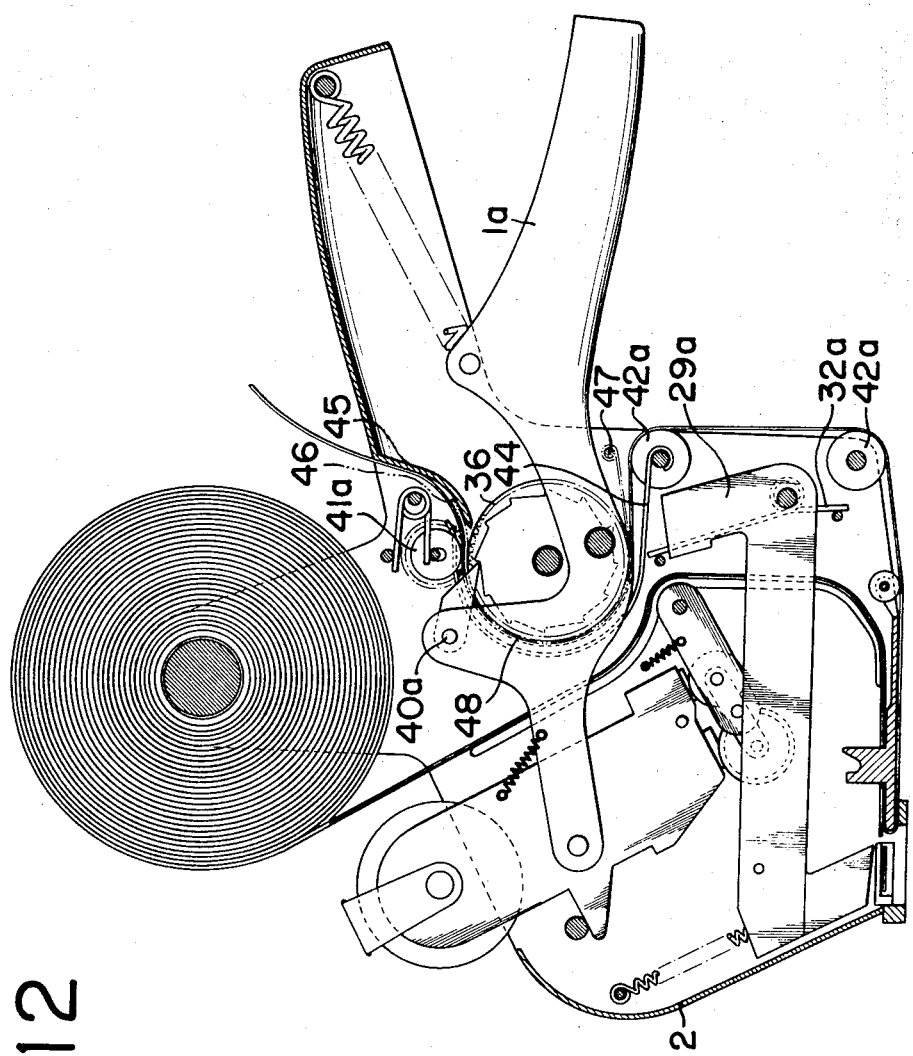
FIG. 12 is a side elevation partly in section of a second embodiment of the invention.

With reference to FIG. 12, a second embodiment of the invention will now be described.

The labeller shown in the first embodiment contains the movable rotor 36 within the frame 2. Differing from this embodiment, the labeller of the second embodiment is somewhat modified in shape and arrangement of a shaft 40a mounted on the swing lever 1a, a roller 41a for the avoidance of detachment, of the projections on the rotor 36 from the tape perforations upper and lower tape guide rollers 42a, a push-out lever 29a and push-out spring 32a; additionally, it has an outer guide wire 44 and a guide frame 45. It performs substantially the same operation as that of the first embodiment. By swing movement of the lever 1a, the labeller can lead the tape automatically in one direction along the guide frame 45 out of the frame 2.

Further, as shown by the chain lines, an internal guide wire 46 has an end secured to a shaft 47 near the upper guide roller 42a and the other end extended longer than the outer guide wire 44 as described above or is carried on a guide frame 45 to contact with slots 48 on the movable rotor 36 in order to lead the tape 7 out of the frame 2 without failure.

A third embodiment of the invention will now be illustrated with reference to FIG. 13.

The labeller shown in the drawing is modified in some part in the construction from the first embodiment, but the operation of the labeller is not changed as described below.

The stamping means 11 is pressed against the forward end of the lever 1b attached to the frame 2 by shaft 3. The stamping direction is determined by the guide member 49 pivoted at its lower end to the stamping means 11 and at its upper end engaging the slotted inner end of the lever 1b. The engaging projection 26 of the side plate of the stamping means 11 and the engaging slot 34 in the first and second embodiments of FIGS. 1 and 12 are replaced in this third embodiment by a projection 26b and an engaging slot 34b of the member 50. The push-out member 28 is also replaced by a single push-out member 28b. A press member 51 engaged with it is pivotally connected to a push-out lever 29b through an engaging shaft 33b. The press member 51 is engaged with the projection 26a on the upper right-hand corner of the push-out member 28b and raised so as to be guided by a guide projection 52. The stamping means can be taken out from the frame 2 by disengaging the screw shown at the lower end of the guide member 49 in FIG. 13. The frame 2 may be covered to avoid interference with its moving parts during operation.

The operation of the above described labeller will be ilustrated with reference to FIGS. 14 to 18.

Figure 14:
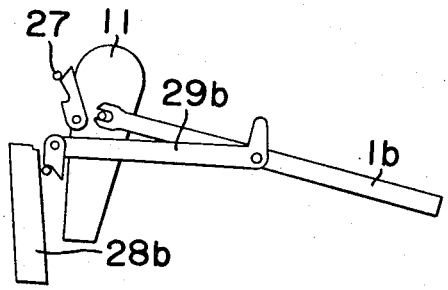
FIGS. 14 to 18 are views illustrating operations of the third embodiment.
Figure 15:
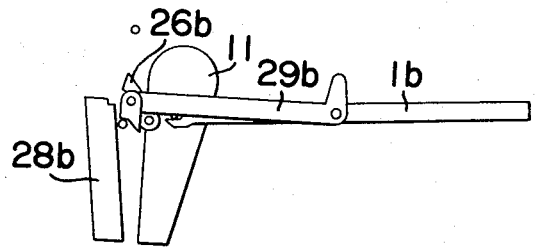
Figure 16:
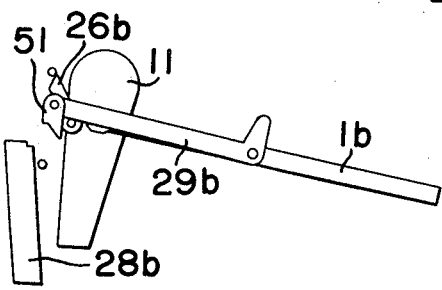
Figure 17:
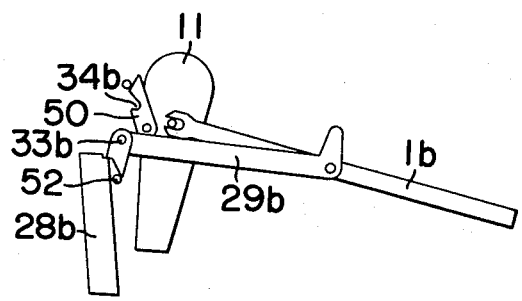
Figure 18:
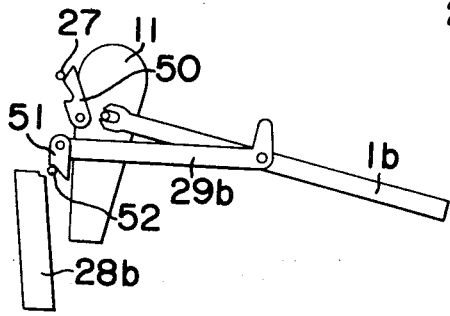

When the lever 1b is pulled upward from its released position of FIG. 14, the stamping means 11 is pushed downwards as shown in FIG. 15, and the stamping means stamps the label 6 and the slot 34b of the member 50 engages with the shaft 33b of the press member 51. Then, by release of the lever 1b, the stamping means 11 rises as shown in FIG. 16. The slot 34b below the engaging projection 26b in the member 50 then engages the shaft 33b and thereby raises the press member 51, which then the projection 26a on the head of the push-out member 28b (FIG. 17). At the same time, the ratchet wheel 38 is revolved by the ratchet bar or pawl 39 to advance the stamped label 6 to the label push-out window 35. The engaging projection 26b is guided by the guide projection 27 on the frame 2 and thereby the shaft 33b is released from the slot 34b. By release of the shaft 33b from the slot 34b, as shown in FIG. 17 the push-out lever 29b, which has revolved counterclockwise in response to the pull of the spring 32b, is forcefully actuated to push out the label 6 stamped by the label push-out member 28b from the label push-out window 35 and enables the label rigidly to be applied on the article. As the label push-out member 28b is pushed downwards by the press, with reference to member 51, the press with reference to member 51 is guided by the guide projection 52 as shown in FIG. 18 so that the label push-out member 28b and the press with reference to member 51 are released. The label push-out member 28b is thus pulled by the spring 31 to be guided into the frame 2.

Figure 13:
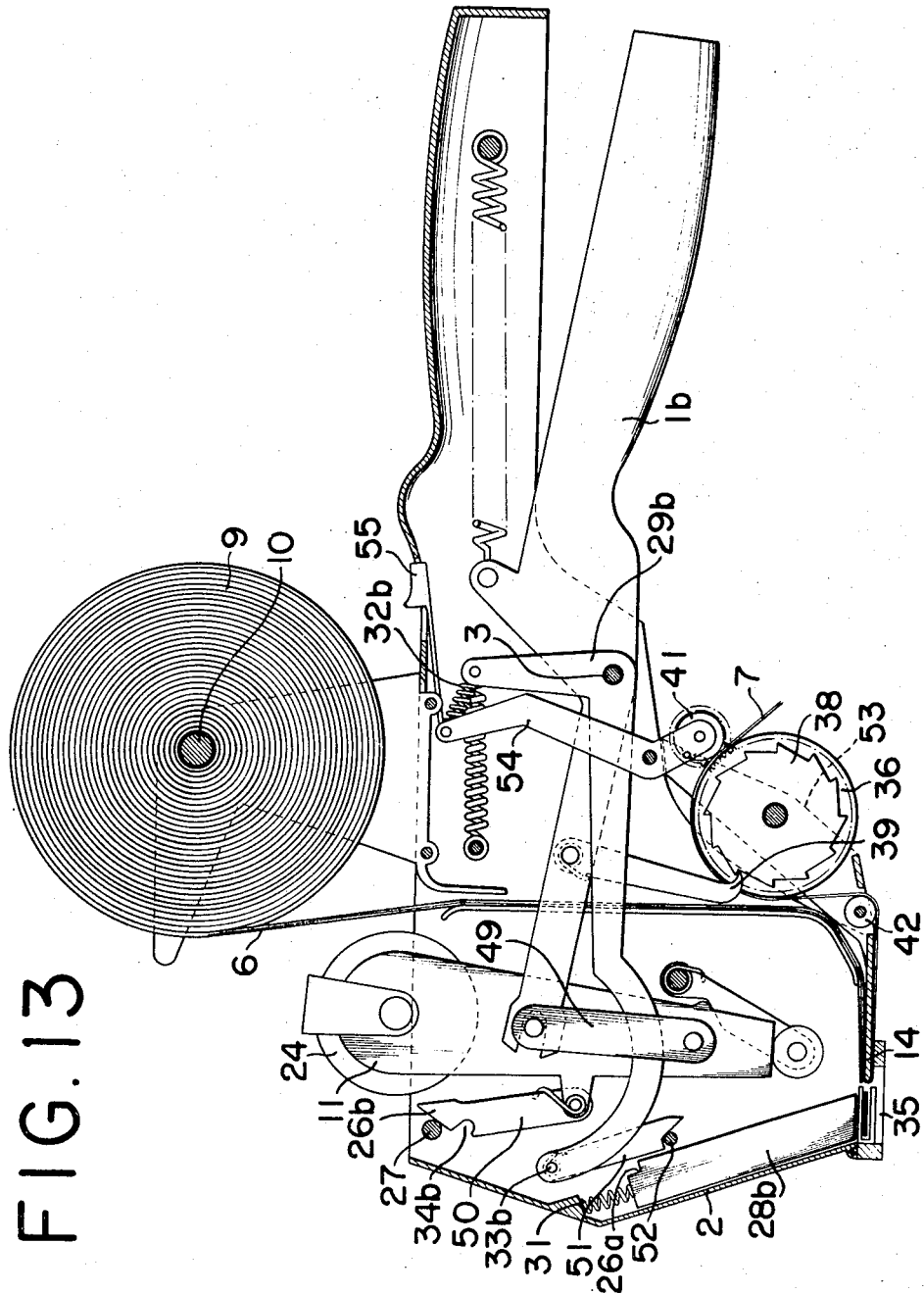
FIG. 13 is a side elevation partly in section of a third embodiment of the invention.

In the above-mentioned embodiment, shown in FIG. 13 the label push-out window 35, the turning part 14, the roller 42 and the movable rotor 36 are integrally mounted upon a support member 53 which is engaged adequately with the support member 54 of the roller 41. For example, the support member 53 is provided with a projection and the suport member 54 is provided with a recess. The support member 54 is adapted to release the engagement of the engaging members 53 and 54 by the depression of a button 55 provided on the hand grip 4 at the rear of the shaft 10. Accordingly, the label band is turned at the turning part 14 with only tape, the labels at the forward end being detached from the label band. The turned tape is wound on the rotor 36 and the roller 41 contacts the rotor 36 by engagement of the engaging members 53 and 54.

In the embodiment as hereinbefore described, the turning part 14 may include a stamp pad such as for example, a turning roller, and the stamping means may be provided in a plural number thereof arranged in parallel to perform the stamping of labels consecutively in plural times. It is also possible to raise the stamping means by revolution of the lever with the pivot shaft of the lever at the forward end and the connecting point with the stamping means in the middle so as to push-out the label, and to lower the stamping means by reverse revolution of the lever and carry out the stamping operation.

Various modifications will be possible if they do not depart from the scope of the invention as claimed in the following.

What I claim is:

1. A labeller comprising
   a frame having a hand grip thereon,
   a swing lever pivotally attached to the frame,
   a label band shaft mounted on the upper part of the frome for holding a coiled label band consisting of labels yieldingly and releasably adhered to a tape and having rotor engaging portions disposed at equal intervals thereon,
   a stamp pad member mounted on the lower part of the frame,
   a tape turning part connected to said stamp pad member for reversely turning said tape,
   a label receiving part on said frame including a push-out window adjacent to said turning part,
   at least one stamping means movably mounted on said frame and operatively connected to the swing lever for stamping a label on the stamping pad in response to the forward movement of the swing lever toward said hand grip on the frame,
   a push-out member movably mounted on said frame for travel toward and away from said push-out window for pushing out from the label receiving part the label separated from the tape in response to the reverse turning of the tape by said tape turning part,
   a movable rotor on said frame having tape engaging projections thereon and rotated in response to the reverse motion of said swing lever away from said hand grip,
   a guide roller mounted adjacent said rotor and adapted to hold the tape thereagainst for accurately feeding the tape,
   a push-out lever operatively connected to said swing lever and responsive to the reverse motion thereof away from said swing lever for moving the push-out member outwardly to effect push-out movement of the label through the push-out window, and
   engaging means operatively connecting said stamping means to said swing lever for performing stamping motion of the stamping means in response to the forward motion of said swing lever toward said hand grip and for controlling the movement of the push-out lever, whereby separation of the label from the tape and pushing out of the label are consecutively performed by one operation of the swing lever.

2. A labeller, according to claim 1, wherein said stamping means is pivotally secured to the forward end of the swing lever by a shaft and stamping is performed by downward swinging movement of said stamping means relatively to said swing lever.

3. A labeller, according to claim 1, wherein said stamping means is guided by a guide member connected to the frame during the pushing and stamping operation of said stamping means by the swing lever.

4. A labeller, according to claim 1, wherein said engaging means includes a projection and a slot on a side plate of the stamping means, wherein said push-out member is secured to the push-out lever, and wherein said push-out lever has a shaft thereon engageable with said slot.

5. A labeller according to claim 1, wherein said engaging means includes a member on the stamping means having a projection and a slot thereon, and wherein the push-out member is engageable with a push member provided on the push-out lever.

6. A labeller according to claim 1, wherein said label receiving part comprises opposite inclined surfaces to provide self-centering action to the label.

7. A labeller according to claim 1, wherein an outer guide wire is provided at the periphery of the movable rotor to carry out automatic feeding of the tape.

8. A labeller according to claim 1, wherein an inner guide wire is provided in contact with the slot on the outer periphery of the movable rotor so as to lead the tape outward.

9. A labeller according to claim 1, wherein the guide roller has a higher peripheral speed relative to the movable rotor to avoid the discrepancy of said movable rotor with the tape.

References Cited

UNITED STATES PATENTS

| | | | |
|---|---|---|---|
| 2,656,063 | 11/1971 | Kafka | 156—384 |
| 3,231,446 | 1/1966 | Satas | 101—90 X |
| 3,265,553 | 8/1966 | Kind et al. | 101—90 X |
| 3,330,207 | 7/1967 | De Man | 101—90 X |
| 3,342,662 | 9/1967 | Grasmann | 156—384 |
| 3,440,123 | 4/1969 | Hamisch, Sr. | 156—384 |
| 3,461,018 | 8/1969 | Kagashima | 156—384 |
| 3,582,433 | 6/1971 | Rothenberg | 156—384 |

ROBERT E. PULFREY, Primary Examiner

E. H. EICKHOLT, Assistant Examiner

U.S. Cl. X.R.

156—506, 523, 577; 101—295, 292